United States Patent
Colmagro et al.

(10) Patent No.: US 9,733,888 B2
(45) Date of Patent: Aug. 15, 2017

(54) METHOD FOR RENDERING DATA IN A NETWORK AND ASSOCIATED MOBILE DEVICE

(71) Applicant: THOMSON LICENSING, Issy de Moulineaux (FR)

(72) Inventors: Jean-Claude Colmagro, Mouaze (FR); Jean-Luc Philouze, Bruz (FR); Julien Dumail, Troguery (FR); Xavier Roche, Cesson Sevigne (FR); Philippe Leyendecker, Chateaugiron (FR); Sebastien Bergot, Cesson-Sevigne (FR); Marcellin Colard, Acigne (FR); Cyril Planchon, Cesson Sevigne (FR)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 14/655,718

(22) PCT Filed: Dec. 20, 2013

(86) PCT No.: PCT/EP2013/077740
§ 371 (c)(1),
(2) Date: Jun. 25, 2015

(87) PCT Pub. No.: WO2014/102196
PCT Pub. Date: Jul. 3, 2014

(65) Prior Publication Data
US 2015/0378664 A1    Dec. 31, 2015

(30) Foreign Application Priority Data
Dec. 28, 2012 (FR) .................... 12 62916

(51) Int. Cl.
*H04H 40/00* (2009.01)
*G06F 3/14* (2006.01)
(Continued)

(52) U.S. Cl.
CPC .......... *G06F 3/1454* (2013.01); *H04L 12/282* (2013.01); *H04L 12/2809* (2013.01);
(Continued)

(58) Field of Classification Search
CPC ......... G06F 3/1454; H04L 67/18; H04W 4/02
(Continued)

(56) References Cited

U.S. PATENT DOCUMENTS 7,076,255 B2    7/2006 Parupudi et al.
7,627,341 B2    12/2009 Wu
(Continued)

FOREIGN PATENT DOCUMENTS

CN    101297269 A    10/2008
CN    102594857 A    7/2012
(Continued)

OTHER PUBLICATIONS

Mrazovac et al: "Smart audio/video playback control based on presence detection and user localization in home environment", Proceedings of the 2011 2nd Eastern European Regional Conference on the Engineering of Computer Based Systems, Sep. 5-6, 2011; IEEE, pp. 44-53.
(Continued)

*Primary Examiner* — Sonny Trinh
(74) *Attorney, Agent, or Firm* — Myers Wolin, LLC (57) ABSTRACT

A method for rendering data in a network is disclosed. The network comprises at least one rendering device and a mobile device. This method, known as a "follow-me" method, comprises a detection of a rendering device by the mobile device thanks to a capture by the mobile device of at least an image of the rendering device; an identification of the detected rendering device by the mobile device from among the at least one rendering device; and a rendering of data on the identified rendering device. An associated
(Continued)

mobile device configured to render data on a display device of a network and network device implementing the rendering method are further disclosed.

14 Claims, 4 Drawing Sheets

(51) Int. Cl.
    *H04L 12/28* (2006.01)
    *H04L 29/08* (2006.01)
    *H04M 1/725* (2006.01)

(52) U.S. Cl.
    CPC ........ *H04L 67/18* (2013.01); *H04M 1/72533* (2013.01); *G09G 2320/0261* (2013.01); *G09G 2370/025* (2013.01); *G09G 2370/04* (2013.01)

(58) Field of Classification Search
    USPC ............... 709/232, 234, 204; 455/3.01, 3.06, 455/414.1, 452.1, 500, 41.2
    See application file for complete search history.

(56) References Cited

U.S. PATENT DOCUMENTS

| | | | |
|---|---|---|---|
| 7,689,001 B2 | 3/2010 | Kim et al. | |
| 7,962,097 B2* | 6/2011 | Jung | H04L 12/2805 455/41.1 |
| 8,078,230 B2* | 12/2011 | Schuler | G06F 3/1454 455/41.2 |
| 8,117,547 B2 | 2/2012 | Parupudi et al. | |
| 8,700,798 B2* | 4/2014 | Van Horck | H04L 29/06027 700/94 |
| 8,949,141 B2* | 2/2015 | Delidais | H04H 60/63 705/14.1 |
| 2002/0046207 A1 | 4/2002 | Chino et al. | |
| 2005/0196131 A1 | 9/2005 | Narusawa et al. | |
| 2008/0147730 A1 | 6/2008 | Lee et al. | |
| 2009/0216351 A1 | 8/2009 | Van Horck et al. | |
| 2009/0252329 A1 | 10/2009 | Casey et al. | |
| 2009/0325642 A1 | 12/2009 | Schuler et al. | |
| 2009/0327927 A1 | 12/2009 | De Leon et al. | |
| 2010/0033617 A1 | 2/2010 | Forutanpour | |
| 2010/0093368 A1 | 4/2010 | Meyer et al. | |
| 2011/0254683 A1 | 10/2011 | Soldan et al. | |
| 2012/0086792 A1 | 4/2012 | Akbarzadeh et al. | |
| 2012/0118947 A1* | 5/2012 | Lyons | G07F 17/3241 235/375 |
| 2012/0287022 A1 | 11/2012 | Queen | |

FOREIGN PATENT DOCUMENTS

| | | |
|---|---|---|
| JP | 2011254326 | 12/2011 |
| KR | 20090127534 | 12/2009 |
| KR | 20100056837 | 5/2010 |
| WO | WO2012047946 | 4/2012 |

OTHER PUBLICATIONS

Foina et al: "How a cell phone can change dramatically the way we watch TV", IEEE Eurocon 2009, May 18-23, 2009; pp. 1265-1271.

Foina: "SmarTV: A multi-person user's behavior analysis and program recommendation system with iTV", 2009 IEEE International Conference on Persuasive Computing and Communications, 2 pp, Mar. 9-13, 2009.

Adler et al: "Vision-guided "Point and Click" for smart rooms", 2007 2nd International Conference on Systems and Networks Communications, Aug. 25-31, 2007; IEEE; pp. 1-7.

Search Report Dated Jan. 31, 2014.

First Office Action issued for corresponding Chinese Patent Application No. 201380068486.6, dated May 17, 2017, with an English translation.

* cited by examiner

METHOD FOR RENDERING DATA IN A NETWORK AND ASSOCIATED MOBILE DEVICE

This application claims the benefit, under 35 U.S.C. §365 of International Application PCT/EP13/077740, filed Dec. 20, 2013, which was published in accordance with PCT Article 21(2) on Jul. 3, 2014 in English and which claims the benefit of French patent application No. 1262916, filed Dec. 28, 2012.

TECHNICAL FIELD OF THE INVENTION

The invention relates to the technical field of communication networks. More specifically, the invention relates to a method for rendering data in a network.

PRIOR ART

A home network, a local network (LAN) or more generally a communication network comprises devices capable of communicating with each other. As a non-restrictive example, a device of a home network is a personal computer, a connected television set, an access modem, a digital decoder, a mobile telephone (possibly of "smartphone" type), a personal digital assistant (PDA), an electronic tablet, a games console or a wireless keyboard.

A user can render an item of audio or video content stored in the network, for example in a digital decoder, on a screen, for example a television set in the living room. Generally, the user uses the remote control of one of the two devices to enter the rendering command. When he has several screens distributed over several rooms, a user may also wish the audio or video content he is watching on a first screen to change screen when the user changes room. In the previous example, when the user moves from the living room to the bedroom, the content no longer displays on the television set of the living room but on that of the bedroom. This function is called "follow-me". Two types of "follow-me" are known, "follow-me" controlled by a remote control or purely automatic "follow-me". In the first case, a user must browse a menu and enter a command using the remote control of the living room in order to provide notification that he wishes to interrupt the display on the screen of the living room, then once in the bedroom, he must pick up a second remote control to provide notification that he wishes to resume the display of the interrupted content on the screen of the bedroom. This first case presents the problem of using control commands which are complicated and unintuitive for the user, for example via a multiple-choice menu controlled by the various remote controls in the various rooms. In the case of purely automatic "follow-me", the network detects the presence of a user in front of a screen. When the user leaves the room, the "follow-me" function can automatically interrupt the presentation of the content on the first screen. Then when the user moves into another room and positions himself in front of a new screen, the network detects the presence of a user in front of this new screen and thus displays the content he was watching. However, this case presents numerous implementation problems notably the recognition of a user and his association with a determined item of content which he is watching or the selection/identification of a user "to be followed" when several users are present in front of a screen.

In addition, different embodiments can be combined with "follow-me" functions which are purely automatic or controlled by remote control. According to a first advantageous embodiment, the display of the content is resumed on the second screen at the moment at which it was stopped on the first screen. According to a second embodiment for example wherein the content is the live broadcast of a sporting competition, it can be preferable to follow the content live that is to say that the content is continually played whether it is displayed on a screen or not. The user thus cannot watch the programme during the time when he is moving and changing room.

In addition, it is noted that mobile devices such as smartphones or tablets participate increasingly actively in the home network. It can thus be noted that the mobile telephone serves as a remote control for devices of the network such as the television set or the decoder, and serves as a source or as storage for audio and/or video content. A user can initiate an action on a specific device of the home network from the mobile telephone, for example the streaming on a screen of the network of a video. Numerous applications on the telephone use a graphical interface and control commands which are simple and intuitive from the user's perspective, for example via a touch screen. A "follow-me" solution controlled simply and intuitively by a mobile telephone would therefore be desirable.

Finally, while the "follow-me" function currently relates to audio/video content, it can be envisaged that a user may more generally forward a context to various screens. A context may be in the form of a video game, a user profile, a user environment (for example the user's Windows environment) or a service (for example a subscription to multicast streams).

A solution would therefore be desirable to the implementation problems previously explained of a "follow-me" function in a network.

SUMMARY OF THE INVENTION

The purpose of the invention is therefore notably to improve the situation, and more specifically to make the introduction of a "follow-me" function by a mobile device intuitive and user-friendly.

For this purpose, the invention notably proposes a method for rendering data in a network, the network comprising at least one rendering device and a mobile device. This method is characterised by the fact that it comprises a detection of a rendering device by the mobile device such that the position of the rendering device is linked to the position of the mobile device; an identification of the detected rendering device by the mobile device from among the rendering devices; the transmission to the network of an item of information representative of the identified rendering device as the rendering device on which said data are rendered and a rendering of data on the identified rendering device wherein the latest step is performed in the network. Advantageously the link refers to the respective spatial position of the mobile device and the rendering device.

The method according to the invention can comprise other characteristics that can be taken individually or in combination, and notably:

the mobile device comprises a camera able to capture images;

the detection comprises the capture by the mobile device of at least one image of the rendering device;

the capture by the mobile device of an image of the rendering device is initiated by the pressing by a user of a first determined key of the mobile device or by a first determined movement applied to the mobile device by the user;

the identification of the rendering device comprises an object recognition step associating a determined rendering device with the image of the rendering device;

each rendering device comprises an identifier representative of the rendering device;

the detection comprises the capture by the mobile device of an image of an identifier representative of the rendering device and the identification of the rendering device comprises a recognition of the identifier associating a determined rendering device with the image of the rendering device;

a preliminary storage of data to be displayed comprising the detection of a rendering device by the mobile device such that the position of the rendering device is linked to the position of the mobile device and the storage of data displayed on the detected rendering device by the mobile device;

the detection of a rendering device when the preliminary storage of data to be displayed comprises the capture by the mobile device of an image of the rendering device;

the capture is initiated by the pressing by a user of a second determined key of the mobile device or by a second determined movement applied to the mobile device by the user;

the first and second button, respectively the first and second gesture, are identical or distinct;

the preliminary storage of data to be displayed comprises stopping the rendering of stored data on the detected rendering device;

the mobile device comprises a rendering device and the preliminary storage of data to be displayed comprises the rendering of stored data on the rendering device of the mobile device;

the steps of detection, identification and rendering are iterated when the position of the mobile device relative to the position of a rendering device changes;

a transmission by the mobile device to a device of the network of an item of information representative of the detected rendering device or of an item of information representative of the identified rendering device.

The invention also proposes a mobile device implementing the method according to one of the preceding claims.

Such a mobile device can, for example, be in the form of a smartphone, a personal digital assistant, an electronic tablet or a dedicated object.

The various modules can for example be implemented in the mobile device but also in a distributed way in the communication network (or "cloud").

BRIEF DESCRIPTION OF THE DRAWINGS

Other characteristics and advantages of the invention will appear upon examination of the detailed description hereafter, and the annexed drawings, wherein.

The annexed drawings can be used not only to complete the invention, but also to contribute to its definition, if necessary.

DETAILED DESCRIPTION

The purpose of the invention is notably to propose a method for rendering data, called a "follow-me" method, using a mobile device D (for example a mobile telephone or dedicated object) on one of the rendering devices A1, A2 or A3 connected by a communication network.

Figure 1:
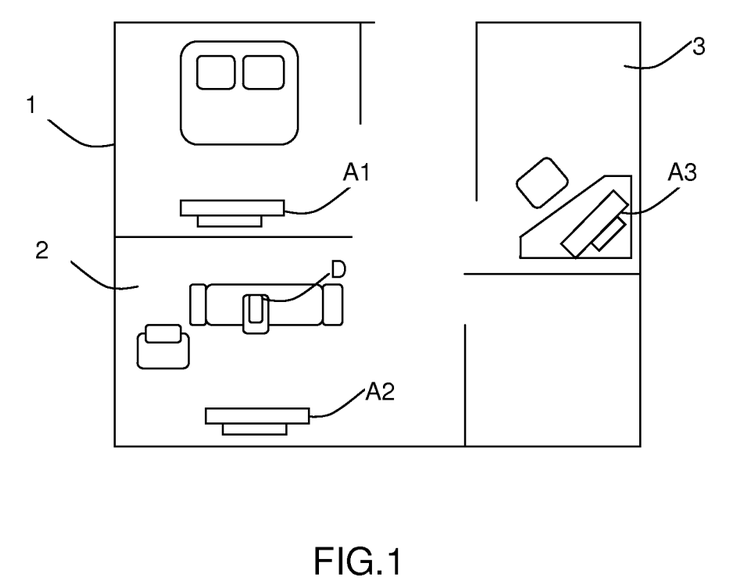
FIG. 1 shows diagrammatically a dwelling, comprising rendering devices and a mobile device, wherein is implemented the method according to an embodiment of the invention.

FIG. 1 shows diagrammatically a dwelling, comprising rendering devices and a mobile device connected by a communication network, wherein is implemented the method according to an embodiment of the invention. In the variant where the content is a visual content such as a film, a photo, the rendering device is a display device. In the variant where the content is an audio content such as a music, the rendering device comprises the display device, an audio device. In the following of the description the rendering device is a display device. The rendering devices or display device A1, A2, A3 are distributed over different rooms of the dwelling respectively a bedroom 1, a living room 2 and a study 3. In what follows, the display device will be called screen or television set. The user, moving from one room to another, can inform the network that he is positioned in front of the screen of a determined room and that he wishes the content, which he was previously watching on another screen in another room, to follow him and to be now presented on the screen in front of which he is positioned in the determined room. For example, the user is in the living room 2. He is watching a television programme on television set A2. According to a particular embodiment, the user stores the television programme by carrying out a particular movement or action with his mobile telephone in front of this television set A2. According to a variant, this storage is followed by the suspension of the display of the stored programme on television set A2. Then, the user moves into the bedroom 1 in front of another television set A1. Again according to a particular embodiment, the user commands the display of the same television programme on the television set A1 by carrying out a particular movement or action with his mobile telephone in front of television set A1. In a first variant, the user continues to follow the television programme on the screen of his mobile when he moves from the living room 2 to the bedroom 1. In a second variant, the programme being broadcast is temporarily stored in a device of the network, for example a digital television decoder. The display of the programme on television set A1 resumes after the change of room by the user, slightly delayed. In a third variant, the display of the programme on television set A1 resumes live after the change of room by the user. The user has thus missed the period of the programme corresponding to the period between the actions performed by his mobile telephone in front of the two television sets to implement "follow-me".

In what follows, it is considered as a non-restrictive example that the communication network R is a home network connected to the Internet network notably by an xDSL access network. The communication network R can be a wired network of cable or fibre type, or a WLAN (Wireless Local Area Network, possibly of 802.11 (or Wi-Fi) or WiMAX type) wireless local network, a very short-range wireless local network of Bluetooth type or a hybrid network. The home network can comprise, as a non-restrictive example, a personal computer, a connected television set, an access modem, a digital decoder, a mobile telephone (possibly of "smartphone" type), a personal digital assistant (PDA), an electronic tablet, a portable media player, a wireless keyboard or a games console. In a variant, the mobile telephone is connected to the network, for example via a Wi-Fi communication interface. The mobile telephone is then able to receive audio/video content, for example a TV stream, to present it on the screen of the mobile. The mobile telephone is also able to receive data representative of a video context, for example a URL (Uniform Resource Locator) corresponding to a web page or a multicast subscription. The mobile telephone is also able to send data representative of a video context, for example a URL for display on a selected screen. But the invention is not limited to this type of home network. Indeed, it also relates to a wireless local network connected to a network of cellular type (for example of 3G type), the local network comprising a fixed display device on which a mobile telephone can store data to be displayed, for example in the form of a URL, and when the mobile device is outside the coverage area of the wireless local network, the mobile telephone continues to display the selected data which are from that moment on transmitted via the cellular network.

Moreover, it is considered in what follows, as a non-restrictive example, that the mobile device D is a smartphone. But the invention is not limited to this type of device. Indeed, it relates to any type of wireless device able to introduce an action for detection of a display device and for communication with the local network for activation of a display on the detected display device. Consequently, it can also relate to, for example an electronic tablet, a personal digital assistant (PDA), a portable games console, a portable media player, an smart camera or a dedicated object such as the cube shown in FIG. 3. In what follows, the mobile device will be called mobile telephone or mobile.

It is also considered that the network comprises at least one display device, a second display device being that of the mobile telephone. Alternatively, it is considered that the network comprises at least two display devices so as to command the display from one to the other using the mobile telephone. The display device is for example a computer screen or a television set directly connected to a communication device of the network, for example a modem connected by a wired (via HDMI for example) or wireless link, or via the intermediary of the home network. In what follows, the display device will be called screen or television set.

A sensor is attached to the mobile device. I what follows it is considered, as a non-restrictive example, that the sensor is a still camera or more generally a camera. Advantageously, this embodiment is compatible with a majority of mobile telephones widely incorporating this type of sensor. But the invention is not limited to this type of sensor. Indeed, it relates to any type of more or less sophisticated sensor making it possible to detect an object that is to say, according to different variants, to determine the shape of the object (for example a parallelepiped with determined areas for the screen), to determine the environment of an object (for example the room in which the screen is located), to determine an identifier presented by the object (for example an identifier which is displayed at the command of the mobile in order to recognise it), or a sound sensor (for example a microphone) making it possible to determine an identifier presented by an audio watermark signal inserted into the sound made by the display device. Optionally, the sensor itself communicates with the devices of the local network for example using NFC (Near Field Communication) technology. As non-restrictive examples, the sensor can be a camera, a microphone or a peripheral. Optionally, a second sensor is also attached to the device, for example of accelerometer, gyrometer or inertial measurement unit type. This second sensor makes it possible to detect the movements applied to the mobile. This second sensor can also be linked to a touch screen technology and makes it possible to detect the pressing actions applied to the touch screen of the mobile.

Moreover, it is considered in what follows, as a non-restrictive example, that the data to be displayed are data representative of an item of audio/video content. But the invention is not limited to this type of data. Indeed, it relates to any type of data representative of a graphical environment or context that is to say all conditions under which a display device is being used. As non-restrictive examples, a context may be in the form of a video game, a user profile possibly associated with user rights, a user environment (for example the user's Windows environment) or a service (for example a subscription to multicast streams).

Figure 2:
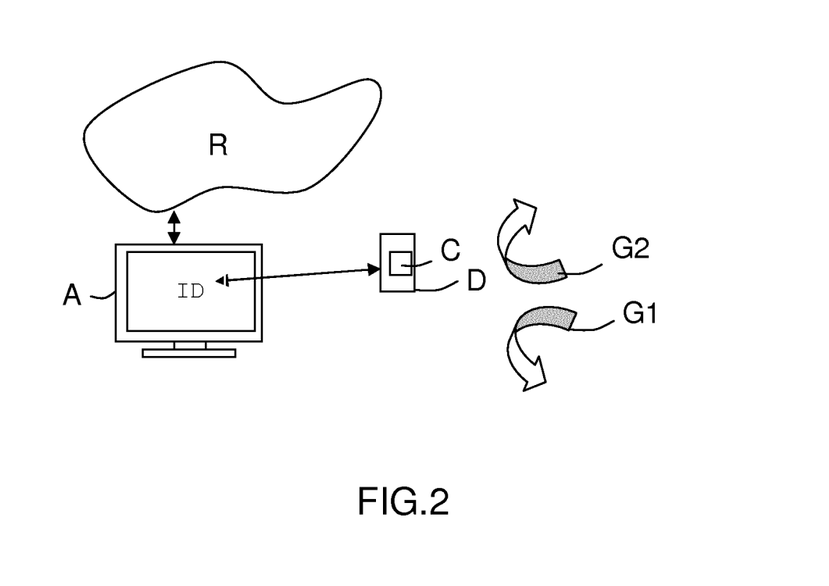
FIG. 2 shows diagrammatically a display device and a mobile device implementing the rendering method according to an embodiment of the invention.

FIG. 2 shows diagrammatically a rendering device such as a display device A and a mobile device D implementing an embodiment of the invention. Display device A and mobile device D are connected to (and are therefore part of) a communication network R. A camera C is associated with mobile telephone D. Advantageously certain tasks, such as object recognition, can be distributed in the local network or Internet (cloud). The entry of the screen A detection command is carried out by a simple gesture G1 of the user applying for example a downwards semi-circular movement to the mobile telephone. The entry of the screen A detection command for selecting the data of the graphical context of screen A is carried out by a simple gesture G2 of the user applying for example an upwards semi-circular movement to the mobile telephone. These two gestures G1 and G2 intuitively mean, respectively, place a context to be displayed onto the screen in front of which you are positioned and take the context currently displayed on screen A. Advantageously, the camera captures the photo according to a well-defined time delay, for example at the end of the movement, so that the image is clear and suitable for image processing. But the invention is not limited to this embodiment. Indeed, it relates to any type of action which the user can apply to his mobile telephone. As a non-restrictive example, the user action is the pressing of a dedicated key on the telephone, the pressing of a dedicated area on the touch screen of the telephone, a specific movement, for example a jolt applied to the telephone or the horizontal or vertical positioning of the telephone, or the bringing of the smartphone near to the screen.

Figure 3:
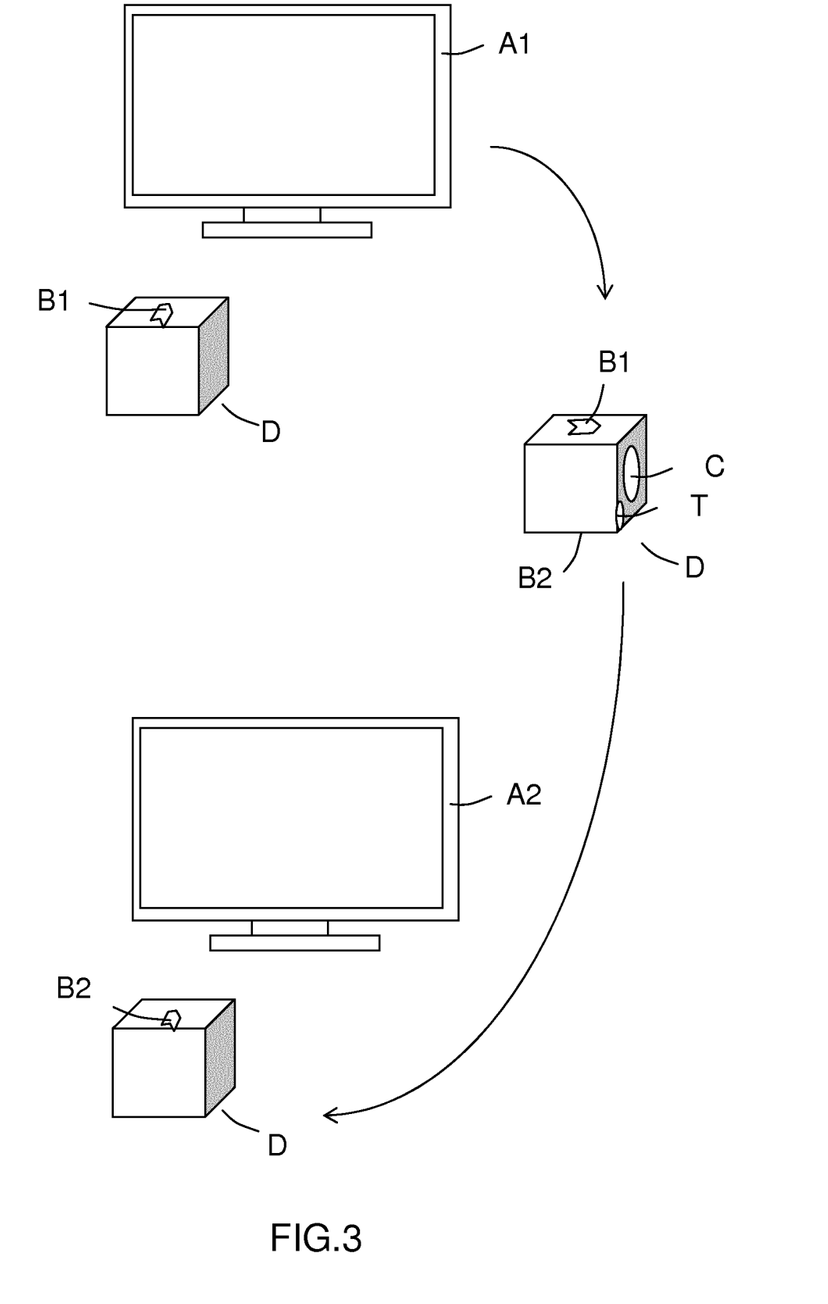
FIG. 3 shows diagrammatically two rendering devices and a mobile device implementing the rendering method according to another embodiment of the invention.

FIG. 3 shows diagrammatically two display devices A1 and A2 and a mobile device D implementing the rendering method according to an embodiment of the invention. Mobile device D is a dedicated object, for example of cubic shape called the cube. It is considered that screen A1 presents data, for example a profile which a user wishes to forward to a screen A2. According to a first variant, cube D comprises a first button B1 (or key) and a second button B2. When a user wishes to store the profile presented on screen A1, he presses button B1. Then when he wishes to display the profile on screen A2, he moves with the cube in front of screen A2 and presses button B2. Buttons B1 and B2 are distinct and positioned on two opposite faces of cube D or according to a refinement, buttons B1 and B2 are identical (only one button B exists), and pressing the button initiates alternately (for example by using a token) a step of storing data and a step of displaying stored data. According to a second variant, cube D comprises no buttons but a sensor of accelerometer type capable of determining which face the cube is laid on. When a user wishes to store the profile presented on screen A1, he positions face B1 upwards. Then when he wishes to display the profile on screen A2, he positions the opposite face B2 upwards. According to a refinement, the two faces B1 and B2 are undifferentiated and the rotation of a face towards an opposite face initiates alternately (for example by using a token) a step of storing data and a step of displaying stored data. Advantageously, cube D comprises a sensor C, for example of camera type, configured to detect screen A1 or A2. Advantageously, cube D comprises a Wi-Fi interface (not shown) enabling the object to communicate with a device of the network. Advantageously, cube D comprises an accelerometer (not shown) making it possible to determine the orientation of the object. Advantageously, cube D comprises an indicator T, for example of LED type, representative of the data storage information (that is to say of the token). The LED is on if an item of content is stored and off if not.

A system implementing the invention can be realised in the form of software (or computer) modules, or else of a combination of electronic circuits and software modules distributed in the various devices of the network. The system comprises a rendering device, a mobile device and functional components associated with the mobile device or in other devices of the network (in the case of a distribution of certain functions such as CPU-intensive object recognition in the mobile telephone).

The functional components are as follows:
- a sensor for detecting the screen in front of the mobile. According to a variant, the sensor is a still camera or a camera; it produces an image of the screen placed in front of it.
- a module for recognising and processing the information extracted from the sensor. According to a variant, a recognition and image processing module whose result is the match between the detected screen and an object from a database. According to a variant, the image processing uses a signature of the image of the front face of the screen, for example comprising visual characteristics distinguishing different rendering devices. According to another variant, the image processing uses a unique identifier ID associated with each rendering device, continually present on the device or presented by the device on request from the mobile telephone.
- a communication module, for example a Wi-Fi or Bluetooth interface, for sending data to and receiving data from the local network. Advantageously, once an object is recognised and associated with the screen, the result of the recognition is sent to the network using the communication module and the reproduction of stored data thereon is possible.
- an orientation sensor (or accelerometer), a touch pad or a button for detecting an action of the user to initiate the actions of a module such as the first sensor or the communication module.

It should be noted that the invention can also be considered from the perspective of a method for rendering from a mobile device, able notably to be implemented by means of a mobile device of the type of those presented above. The features offered by the implementation of the method according to the invention being identical to those offered by the device D, only the combination of main features offered by the method is presented hereafter.

Figure 4:
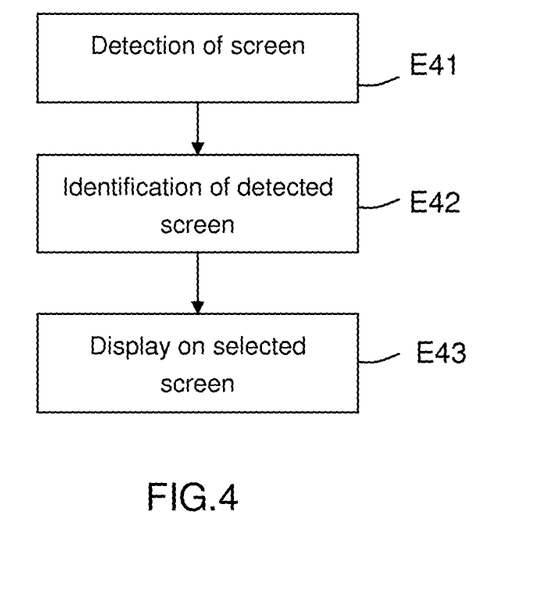
FIG. 4 shows diagrammatically the rendering method according to an embodiment of the invention.

FIG. 4 shows diagrammatically the method for rendering according to an embodiment of the invention.

In the initial state, the screen and the mobile device are idle. Optionally the screen is not idle but displays an item of content distinct from that which the user wishes to display.

In a first step E41, the user brings his telephone near to the screen on which he wishes to enter a content display command of "follow-me" type. The position of the display screen is thus linked to the position of the telephone. According to an embodiment of the detection, a photo of the screen is taken when the user presses a key or touch area of his telephone or applies a movement recognised by the second sensor of accelerometer type. According to a variant, an identifier for example in the form of a visual tag (or for example a sound tag in the case of an audio sensor or also an RFID tag in the case of an NFC sensor) is present on the screen and therefore on the image thereof. This identifier can be present permanently or temporarily on the screen: for example before taking the photo, the telephone sends an identifier display request to all the screens of the house then the telephone automatically captures a photo of the screen after a certain time delay in such a manner that the identifier display command can be executed. An image of the screen, optionally with an identifier, is therefore available at the end of the step of detection.

In a second step E42, the detected screen is identified and selected so as to command the display command. According to an embodiment based on an image sensor, an image processing and object recognition module is applied to the image so as to determine from among the list of screens of the local network, the screen detected on the image. According to a variant, the identifier on the image is determined. According to another variant, an identifier (of RFID type or of audio watermark type) detected by a sensor other than a camera (NFC sensor, microphone) is determined. The processing is thus adapted to the information at the output of the sensor used. Advantageously, the mobile telephone stores in its memory the list of screens of the dwelling, that is to say of the home network. According to a variant, the mobile telephone sends over the network an item of information representative of the selected screen. According to another variant, the information at the output of the sensor, for example the captured image, is sent over the network and the identification of the screen from the information of the sensor is carried out in a distributed way in the network. At the end of this step, the screen selected by a user using his mobile telephone as a means of detection and of identification is determined.

Finally in a third step E43 data are displayed on the selected screen. For example, the mobile telephone sends a request via the communication module comprising the identifier of the device and the display command. According to a variant, this request is sent during the step of identification. Advantageously, once the command is entered, the user can put down his mobile telephone. The selected screen displays the content and the method returns to the initial state.

Figure 5:
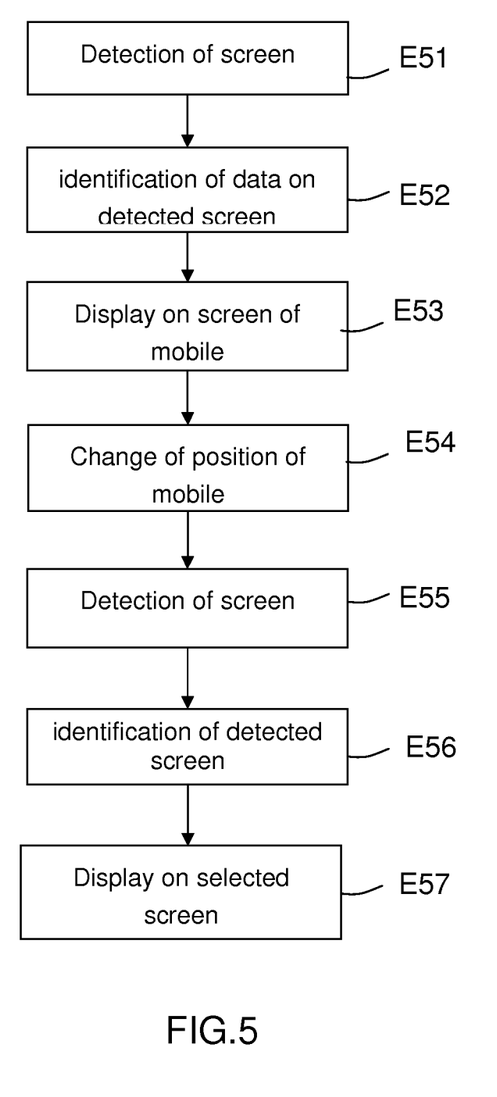
FIG. 5 shows diagrammatically the rendering method according to another embodiment of the invention.

FIG. 5 shows diagrammatically the method for displaying according to another embodiment of the invention. In this embodiment, the method comprises a preliminary step of storing data to be displayed. In what follows, by storage of data is understood both the sharing of information of what is currently presented by a screen and the storage in the memory of the mobile device of a user profile or of an environment which will for example be presented as a screen background as soon as a user commands its display via the method previously described.

In the initial state, the screen displays data which the user wishes to forward for display on a selected screen.

In a first step E51, the user brings his telephone near to the screen on which he wishes to store data for example a context, an item of audio/video content or a TV programme. The position of the data display screen is thus linked to the position of the telephone. Any type of sensor or detection information previously described for the step of detection E41 is compatible with this embodiment. An image of the screen, optionally with an identifier, is therefore available at the end of the step of detection.

In a second step E52, the data presented on the detected screen are identified and stored so as to set the parameters for the subsequent display command. Advantageously, the mobile telephone comprises a screen and the data to be stored are presented on the screen of the mobile telephone. Advantageously, when the mobile is outside the coverage area of the local network, it receives the data via a network of cellular type, for example of 3G type. At the end of this step, the data or the information representative of these data are stored in the mobile telephone of the user. Advantageously, at the end of the step of storage, the detected display device stops presenting stored data.

According to the variant wherein the mobile telephone comprises a screen, in a third step E53, the stored data, for example a video stream, are presented on the screen of the mobile telephone. Advantageously, the data to be displayed are sent continuously to the mobile telephone by the local network (for example via Wi-Fi communication) then by a network of 3G cellular type which takes over from the local network when the mobile leaves the coverage area of the local network.

In a fourth step E54, the user moves with his mobile and positions himself in front of a new screen (which can be the same if the step of displaying on the screen of the mobile has been implemented) with the intention of forwarding the stored data to and displaying these data on this new screen.

During steps E55 to E57, steps E41 to E43 previously described for FIG. 3 are repeated. Advantageously, the stored data are displayed on the selected screen. Advantageously, the mobile device sends to a device of the network via a communication interface information representative of the selected screen and information representative of stored data. Advantageously, once the command for displaying stored data is entered, the user can put down his mobile telephone. The selected screen displays the stored content and the method returns to the initial state.

The invention advantageously enables a user to have the feeling that his action is recognised by the network as the action is very intuitive and is also commanded by a mobile device such as a smartphone which is linked to a user and which he always has in his possession.

The invention is not restricted to embodiments of the mobile device, network display device and display method described above, provided only as a non-restrictive example, but includes all the variants that can be envisaged by those skilled in the art in the framework of the following claims.

The invention claimed is:

1. A method for rendering data in a network, said network comprising at least one rendering device and a mobile device, the method comprising:
   detecting a rendering device by said mobile device by capturing at least an image of said rendering device;
   identifying the detected rendering device by the mobile device among the at least one rendering device for rendering the data; and
   transmitting to a device of the network, by the mobile device, an item of information representative of said identified rendering device.

2. The method according to claim 1, wherein the capturing of the image of the rendering device further comprises detecting a first user action on the mobile device or detecting a first motion gesture of the mobile device to initiate the capturing.

3. The method according to claim 1, wherein the identification of the rendering device comprises an object recognition associating a determined rendering device with said image of said rendering device.

4. The method according to claim 1, wherein each rendering device comprises an identifier representative of said rendering device, wherein said image of said rendering device comprises said identifier and wherein the identification of the rendering device comprises a recognition of said identifier associating a determined rendering device with said image.

5. The method according to claim 1, further comprising:
   storing data displayed on said detected rendering device by said mobile device.

6. The method according to claim 5 wherein the capturing of the image by the mobile device for preliminary storing further comprises detecting a second user action on the mobile device or detecting a second motion gesture of the mobile device.

7. The method according to claim 5 wherein the preliminary storing of said data to be displayed comprises stopping the rendering of said data on said detected rendering device.

8. The method according to claim 5 wherein said mobile device comprises a mobile rendering device and wherein the preliminary storing of said data to be displayed comprises the rendering of said data on said mobile rendering device.

9. The method according to claim 1 further comprising iterating the detecting, the identifying, and the transmitting.

10. A mobile device configured to render data in a network, said network comprising at least one rendering device and said mobile device; said mobile device comprising:
    a camera configured to detect a rendering device and configured to capture at least an image of said rendering device;
    a processor configured to identify the detected rendering device for rendering the data among the at least one rendering device; and
    a transmitter configured to transmit to a device of the network an item of information representative of said identified rendering device.

11. The mobile device according to claim 10, wherein camera configured to capture the image is initiated upon detection of a first user action on the mobile device or upon detection of a first motion gesture of the mobile device.

12. The mobile device according to claim 10, further comprising a mobile rendering device configured to render said data.

13. The mobile device according to claim 10 wherein the mobile device is further configured to preliminary store said data to be rendered, when a capture of an image of said rendering device is initiated by detection of a second user action on the mobile device or by detection of a second motion gesture of the mobile device.

14. A network device for rendering data in a network, said network comprising at least one rendering device and a mobile device; said network device comprising a processor configured to:

detect a rendering device from a capture of at least an image of said rendering device by said mobile device;
identify the detected rendering device for rendering the data among the least one rendering device; and
transmit through the network of an item of information representative of said identified rendering device.

* * * * *